(12) United States Patent
Guntuku et al.

(10) Patent No.: US 11,528,196 B2
(45) Date of Patent: Dec. 13, 2022

(54) SYSTEMS AND METHODS FOR GENERATING A COGNITIVE ANALYTICS HUB AND PREDICTIVE ACTIONS FROM DISTRIBUTED DATA MODELS

(71) Applicant: Verizon Patent and Licensing Inc., Basking Ridge, NJ (US)

(72) Inventors: Kishore K. Guntuku, Ashburn, VA (US); Vamsi Krishna Boyapati, Metairie, LA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 160 days.

(21) Appl. No.: 17/025,310

(22) Filed: Sep. 18, 2020

(65) Prior Publication Data
US 2022/0094609 A1 Mar. 24, 2022

(51) Int. Cl.
*H04L 41/22* (2022.01)
*G06F 3/04847* (2022.01)
*G06F 16/2455* (2019.01)
*G06N 3/08* (2006.01)

(52) U.S. Cl.
CPC .......... *H04L 41/22* (2013.01); *G06F 3/04847* (2013.01); *G06F 16/24558* (2019.01); *G06N 3/08* (2013.01)

(58) Field of Classification Search
CPC ....... H04L 41/22; H04L 43/16; H04L 41/147; H04L 43/0876; H04L 41/145; G06F 3/04847; G06F 16/24558; G06N 3/08
See application file for complete search history.

(56) References Cited

U.S. PATENT DOCUMENTS

| | | | |
|---|---|---|---|
| 9,195,640 B1* | 11/2015 | Donneau-Golencer | G10L 15/00 |
| 2005/0240858 A1* | 10/2005 | Croft | G06F 16/93 715/255 |
| 2020/0184009 A1* | 6/2020 | Wood | H04L 67/10 |
| 2021/0097055 A1* | 4/2021 | Bar-on | G06F 3/14 |

* cited by examiner

*Primary Examiner* — John T Repsher, III

(57) ABSTRACT

A cognitive database system matches a particular data element, that is specified as part of received user input, to a first set of data elements in a set of data models based on semantic commonality, and matches the particular data element to a second set of data elements in the set of data models based on visual commonality between graphical representations of the particular data element and the second set of data elements. The cognitive database may determine interdependency between the particular data element and a particular subset of the first and second sets of data elements based on a measure of semantic commonality and/or visual commonality, and may generate a response to the user input with values from the particular subset of data elements that are updated directly from the interdependency that is determined upon receiving the user input.

20 Claims, 10 Drawing Sheets

SYSTEMS AND METHODS FOR GENERATING A COGNITIVE ANALYTICS HUB AND PREDICTIVE ACTIONS FROM DISTRIBUTED DATA MODELS

BACKGROUND

In an enterprise or other large organization, actions may be driven by input from disparate groups and/or data models (e.g., integrated data models) that are maintained by the different groups. Data in the different data models may be interdependent, linked, and/or otherwise related, and different groups may contribute to and/or manage the different data models at different times without consideration of the interrelationships and/or input from other groups. Consequently, actions may be generated from incomplete, out-of-sync, and/or erroneous data.

DETAILED DESCRIPTION OF THE PREFERRED EMBODIMENTS

Figure 1:
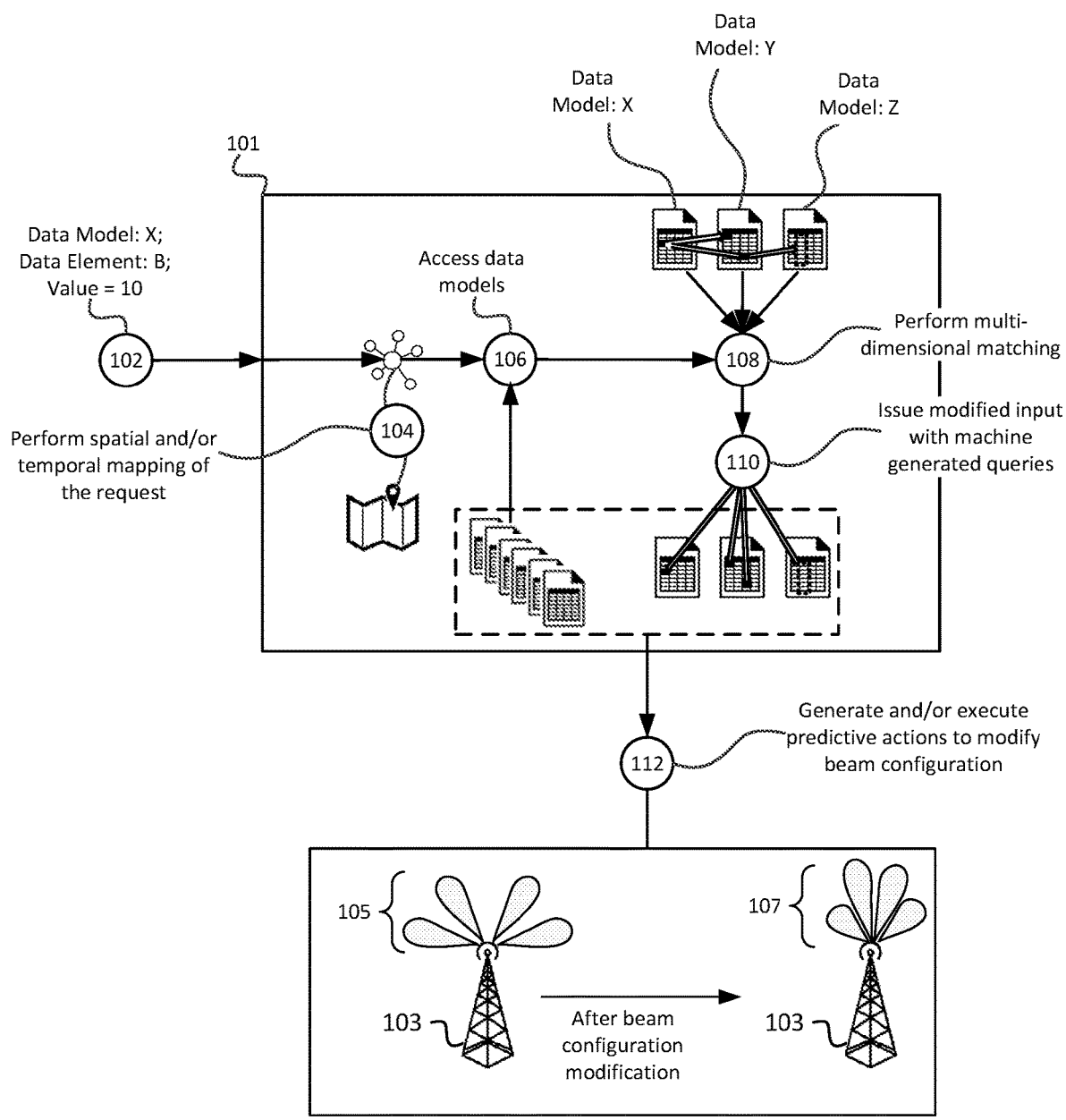
FIG. 1 illustrates example operation of a cognitive database system in accordance with some embodiments presented herein, which may be used to propagate user input across interrelated data in a set of data models, and may modify network parameters that control different network operations and/or network behavior based on the updated data from the set of data models.

The following detailed description refers to the accompanying drawings. The same reference numbers in different drawings may identify the same or similar elements.

Systems and methods, described herein, may provide a cognitive database system for automatically detecting dependencies and/or relationships between interrelated data in a set of data models via a multi-layer or multi-dimensional matching. The cognitive database system of some embodiments may be used to seamlessly access and/or update particular data that is implicated in user input and interrelated data with dependencies and/or relationships to the particular data as determined from the multi-dimensional matching. For instance, the cognitive database system of some embodiments may receive user input that involves changing the value of a particular data element that is stored in a particular data model. The cognitive database system may determine that data elements within one or more data models are affected by the change to the particular data element based on detected dependencies between the data elements, and/or may propagate changes to the data of the data elements within the one or more data models without the user input directly specifying and/or accessing the affected data elements or the affected data models. The cognitive database system may automatically generate predictive actions by accounting for the updated data that results from the user input and the propagated data, and/or the dependencies between the data in the different data models. The cognitive database system may automatically execute the predictive actions. In accordance with some embodiments, executing the predictive actions may include changing configuration parameters, reallocating resources, shifting capacity, enabling or disabling Radio Access Technologies ("RATs"), and/or otherwise modifying operation and/or behavior of wireless networks.

In some embodiments, the cognitive database system may be optimized to perform the multi-dimensional data matching, seamless data access and updating, predictive action generation, and/or predictive action execution in real-time and/or directly in response to receiving the user input. For instance, the cognitive database system may receive input relating to monitored conditions or metrics associated with a Radio Access Network ("RAN") of a wireless network, such as the number of active connections at a particular RAN, performance metrics associated with a particular RAN, and/or other types of information associated with a particular RAN. The cognitive database system of some embodiments may update other data models that derive congestion, performance, and/or other usage metrics in part based on the monitored conditions or metrics (e.g., a number of active connections or other suitable information), may determine from the collective set of updated data across a plurality of data models that capacity or performance at the particular RAN does not provide an acceptable quality of service, and may generate and/or execute a predictive action to modify network parameters at the particular RAN to increase capacity and/or performance in response to the monitored conditions or metrics.

The cognitive database system may provide a centralized analytics hub from which users may access and/or update data from the different data models without individually accessing each data model and/or without explicitly identifying the data model that stores data that is of interest. Instead, the cognitive database system may control the data model access and/or updating to ensure that a manual update made to a particular data element does not create inconsistencies, synchronicity, and/or other issues relating to other data elements because of existing relationships and/or dependencies between the particular data element and other data elements in the same and/or other data models.

FIG. 1 illustrates example operation of cognitive database system 101 in accordance with some embodiments presented herein. Cognitive database system 101 may provide a user interface ("UI"), and cognitive database system 101 may receive (at 102) user input from user equipment ("UEs") that access the UI. In some embodiments, the UI may include or correspond to an Application Programming Interface ("API"), via which the user input may be communicated to cognitive database system 101. The user input may specify updates to one or more data elements and/or a request to access a report that includes the data from the one or more data elements. In some embodiments, the user input may be automatically generated by one or more sensors and/or devices. In some such embodiments, the sensors and/or devices may access the UI, API, and/or other interface in order to automatically provide updated data for data elements of the data models, and/or access the data from the data models as part of automatically effecting changes to a network configuration, network resources, and/or performing other automated actions based on the data compiled from the data models.

Cognitive database system 101 may perform (at 104) a spatial mapping and/or temporal mapping of the user input and/or UE. For instance, the spatial mapping may include determining a location of the UE based on UE-determined location information (e.g., as determined by the UE using Global Positioning System ("GPS") techniques or other suitable techniques), network-determined location information (e.g., as determined using network triangulation or some other suitable technique), location based on network addressing of the UE, and/or other location information associated with the UE. The temporal mapping may include determining time characteristics associated with the user input (e.g., date and/or timing of the request).

Cognitive database system 101 may use the results of the spatial mapping and/or temporal mapping in order to determine various characteristics about the requestor, and to use the requestor characteristics to filter data model access and/or to determine the user input scope. For instance, the spatial mapping may identify the location of the requestor to be at a particular site. Cognitive database system 101 may provide a department identification (e.g., sales, engineering, support, etc.) for the user input based on the identified location. In other words, different locations may be associated with different classifications, categories, etc., such as a department associated with a given UE and/or a set of locations from which requests are issued.

Cognitive database system 101 may access (at 106) a set of data models. The set of data models may be accessed, updated, and/or managed by different groups within an enterprise or organization. In some embodiments, the set of data models may be stored at different locations and/or using different devices.

Cognitive database system 101 may perform (at 108) a multi-dimensional matching based on the user input and/or the spatial and/or temporal mapped requestor characteristics. Performing (at 108) the multi-dimensional matching may include matching the data from the set of data models based on textual, semantic, visual, image, and/or other relationships or similarities.

Cognitive database system 101 may perform (at 108) the multi-dimensional matching in order to determine and/or verify relationships between data implicated by the user input and other data in the set of data models. For instance, cognitive database system 101 may perform semantic, visual, and/or other matching to determine dependencies between first data identified in the user input and second data in the same or different data models, redundant or alternative representation of the first data in different data models, synchronicity between the first data and the second data in the data models, and/or other suitable relationships in which a change to the first data has an impact to the second data in the same or different data model.

In some embodiments, the requestor characteristics, that are determined from the spatial and/or temporal mapping, may be used in selecting a subset of the set of data models against which to perform (at 108) the multi-dimensional matching. For instance, if cognitive database system 101 determines that the requestor is affiliated with a particular department or group within the enterprise based on the mapping, the cognitive database system 101 may limit the scope of the user input to a subset of the data models that can be modified and/or accessed by that particular department or group, and prevent the user input from modifying and/or accessing the data or related data in other data models.

Cognitive database system 101 may modify the input based on the data relationships that are determined from the multi-dimensional matching, and may issue (at 110) the modified input in place of the original input. The modified input may access and/or update a first set of data in a first set of data models that are implicated by the user input, and also a second set of data in a second set of data models that are not implicated by the user input but that are dependent on, impacted by, and/or otherwise related to the first set of data. In other words, cognitive database system 101 may dynamically determine a subset of the set of data models that are affected by the user input or that contain additional relevant information beyond what is requested in the user input, and may provide access to or propagate changes to implicated data elements from the subset of data models.

For instance, the original user input may change a first data element that identifies which subscriber UEs are authorized to access one or more services via a particular Radio Access Network ("RAN"), in a first data model. Cognitive database system 101 may determine from the multi-dimensional matching that the first data element has an established relationship with a second data element, that derives the list of RATs and/or services that are accessible from the particular RAN based on the identification of authorized subscriber UEs, in a second data model, and a third data element, that stores performance parameters of the particular RAN based on expected or historical usage of the authorized subscriber UEs, in a third data model. Accordingly, cognitive database system 101 may generate the modified input to include a first message or query for accessing and/or updating the first data element in the first data model according to the original input, a second message or query for accessing and/or updating the second data element in the second data model based on a first relationship between the first data element and the second data element and the change being made to the first data element, and a third message or query for accessing and/or updating the third data element in the third data model based on a different second relationship between the first data element and the third data element and the change being made to the first data element. In this manner, cognitive database system 101 may preserve synchronicity of the same data element across the data models, and may ensure data updates are propagated throughout an entire linked chain of interrelated data rather than to a single data element that is identified in the user input, thereby ensuring data completeness, synchronicity, consistency, and accuracy across the data models.

Cognitive database system 101 may generate (at 112) and/or execute one or more predictive actions in response to updating the particular data and automatically propagating the update to interrelated data of other data models. In particular, cognitive database system 101 may provide the data models, after the user input is propagated across the related data elements, as input to one or more predictive models, and the predictive models may output the one or more predictive actions to account for the holistic state change that is captured within the data models.

The set of data models that are referenced in FIG. 1 may represent different datasets for tracking and/or managing RAN metrics and/or configuration information regarding one or more RANs that provide wireless coverage in different geographic areas. For instance, the set of data models may include usage data models, resource data models, subscriber data models, location-based models, and/or other data models indicating available and/or used Radio Frequency ("RF") resources associated with one or more base stations (e.g., Next Generation Node Bs ("gNBs"), evolved Node Bs ("eNBs"), and/or types of base stations) that provide wireless coverage in a geographic area, a quantity of UEs connected to respective base stations, performance and/or Quality of Service ("QoS") metrics associated with respective base stations (e.g., throughput, latency, jitter, indications of whether QoS thresholds are met, or the like), indications of network slices used by the UEs (e.g., where a "slice" refers to an instance of a network in which multiple instances are implemented or available), particular Radio Access Technologies ("RATs") and/or frequency bands used by the UEs to communicate with respective base stations, an antenna and/or beamforming configuration associated with respective base stations (e.g., directionality, beam width, beam power, etc.), and/or other information related to performance or configuration of one or more RANs that are present in a geographical area. The set of data models may include information regarding locations, configurations (e.g., of MIMO antennas or other antennas, radios, etc. that have configurable parameters, such as directionality, beam width, antenna power, or the like), and/or other parameters of configurable network infrastructure elements, such as base stations, antennas, radios, or the like.

As a result of the propagated updates, the set of data models may indicate a shift in network demand at the geographic area corresponding to base station 103. In particular, the usage data models may indicate an expected increase in usage at the geographic region, the resource data models may indicate that base station 103 is associated with first beam configuration 105 that has first directionality, beam width, antenna power, and/or other beam parameters, and/or the subscriber data models may indicate UE usage signatures.

Based on the holistic data and propagated changes to the set of data models, cognitive database system 101 may generate (at 112) a predictive action for modifying network parameters at base station 103, such as beamforming parameters, resource allocation parameters, and/or other types of parameters. The predictive action may enhance network efficiency for UEs that access content and/or services via network connectivity provided by base station 103, and/or may improve the user experience for those UEs.

In some embodiments, the predictive action may correspond to an executable action that may be automatically executed by cognitive database system 101 and/or another device. As shown in FIG. 1, cognitive database system 101 may automatically execute (at 112) the predictive action in order to modify directionality, beam width, antenna power, and/or other aspects for first beam configuration 105 of base station 103, resulting in base station 103 operating with a modified second beam configuration 107. For example, modified second beam configuration 107 may provide additional RF resources such that the coverage area associated with base station 103 is more focused to the locations where predicted usage is expected to be higher.

In some situations, relationships between different data elements, including data elements of different data models, may be ambiguous, or otherwise unascertainable due to the potential use of different labels, tags, and/or other identifiers to refer to the same data element. For instance, the same product, network performance or load metric, or other type of information may be identified using slightly varying names in different data models.

Some data models and/or data elements may establish relationships between different data elements semantically by using the same identifier as a key for identifying related data elements, or by using the same value for different data elements. Some data models and/or data elements may establish relationships between different data elements with formulas, links, pointers, and/or other interdependencies. For instance, a particular data element may include a hashing function or other type of function or operation for deriving the particular data element value from one or more cells and/or other data elements of the different spreadsheets, datasets, and/or data models.

In some embodiments, relationships between different data elements may be specified visually and/or with image data. For example, different data elements in different data models having different keys and/or values may be color coded the same to represent a relationship between those data elements, such as similarity or correlation scores, deterministic weights, comparators, or other types of values signifying relationships between different data elements. As a specific example, network sites may be illustrated with a red color, whereas performance metrics for the network sites may be illustrated with a blue color. Even though the network site data and the performance metric data are stored in separate data elements, the relationship between the network site data and the particular metric data may be established via the color-coding and/or positioning of the data elements relative to one another in the data model (e.g., data for a blue cell that is to the right of data for a red cell are related).

In some embodiments, relationships between data elements may be established through spatial joins and/or recognition of image data with semantic or textual data. For instance, an image of a map may be populated with data that is related to or is referenced semantically or textually in another data model. Cognitive database system 101 may determine relationships between the image data and the semantic or textual data based on common identifiers, such as common addressing, geographic coordinates, and/or other spatial similarity, that are determined from performing a spatial join and/or image recognition of the image data with the semantic or textual data.

Figure 2:
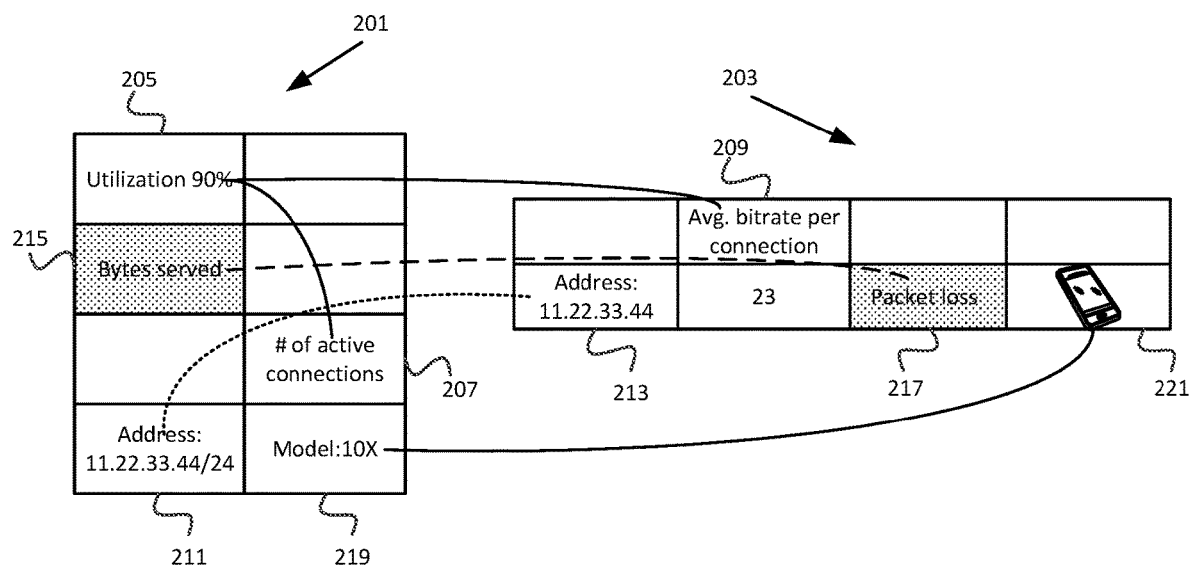
FIG. 2 illustrates an example of multi-dimensional semantic, visual, and/or other relationships that may exist between data and/or data elements of a first data model and a second data model in accordance with some embodiments presented herein.

FIG. 2 illustrates an example of multi-dimensional semantic, visual, and/or other relationships that may exist between data and/or data elements of first data model 201 and second data model 203 in accordance with some embodiments presented herein. As shown in FIG. 2, first data model 201 and second data model 203 may represent different spreadsheets, each having a plurality of sheets or tabs, and each sheet containing a plurality of different data elements or cells.

Data element 205 in first data model 201 may correspond to a network utilization metric that is derived from the number of active connections stored in data element 207 of first data model 201, and the average bitrate per connection stored in data element 209 of second data model 203. Data element 211 in first data model 201 may be linked to data element 213 in second data model 203 based on a semantically similar identifier being used. Data element 215 in first data model 201 may provide additional data for data element 217 in second data model 203 based on the data elements 215 and 217 being color-coded with the same color. Data element 219 in first data model 201 may store data value that is derived from the image in data element 221 of second data model 203.

Cognitive database system 101 may perform the multi-dimensional matching to determine each of these and/or other relationships that may exist between different data in the data models. In order to perform the multi-dimensional matching, cognitive database system 101 may convert the data models to a searchable and/or indexable format.

In some embodiments, cognitive database system 101 may vectorize the data and/or data elements from the data models into dataframes. A dataframe may be a two-dimensional, size-mutable, and/or potentially heterogeneous data structure. The dataframe may have a tabular format that organizes the data into rows and columns. In some embodiments, the dataframe format may be similar to a Structure Query Language ("SQL") table. The dataframe may store and/or represent the data (e.g., semantic or textual information), formulas, visual information (e.g., color-coding), and/or other information within a data model.

Vectorizing the data model may include converting the data from a data model into different vectors. In some embodiments, cognitive database system 101 may use various existing APIs to convert the data models into dataframes and/or vectorize the data from the data models, for example Python pandas or the like A vector may include an array-based or matrix-based representation of the data. Standard mathematical functions and/or other operations may then be applied to quickly access, manipulate, and/or otherwise read and write the data from the data models. For instance, a vector may correspond to a matrix that represents a particular data element from a particular data model with entries and/or indices that correspond to the set value for the particular data element and other acceptable values from the particular data element. In addition to the value of the particular data element, a vector may be used to store other characteristics or attributes of the particular data element. For instance, the vector may store the formulas associated with the particular data element, color-coding of the particular data element in the particular data model, images, and/or other data that may be defined for and/or associated with the particular data element in the particular data model.

Cognitive database system 101 may perform the multi-dimensional matching using the dataframes and/or vectors. The multi-dimensional matching may include matching the data from the data models based on textual, semantic, visual, image, and/or other matches or similarities. In particular, cognitive database system 101 may identify a match from comparing different sets of vectors, and from detecting various commonality in one or more of the comparisons.

Cognitive database system 101 may match across the different dimensions in order to detect relationships that may not be present in a first dimension, but that exist in another dimension, and/or to validate or verify that a determined relationship is correct and/or accurate. Accordingly, in some embodiments, cognitive database system 101 may score each match that is made in each dimension with a confidence score, and may verify the accuracy of the match when the cumulative score resulting from detecting the same match in the different dimensions satisfies a threshold. For instance, cognitive database system 101 may determine, via semantic matching, that a first data element "product_ABC" in a first dataframe representing a first data model is a 60% match to a second data element "product_ABC_v1" in a second dataframe representation of a second data model. Cognitive database system 101 may further determine that the first data element and the second data element are color-coded the same color, and may therefore increase the accuracy of the match to verify that the first data element and the second data element relate to the same data.

Figure 3:
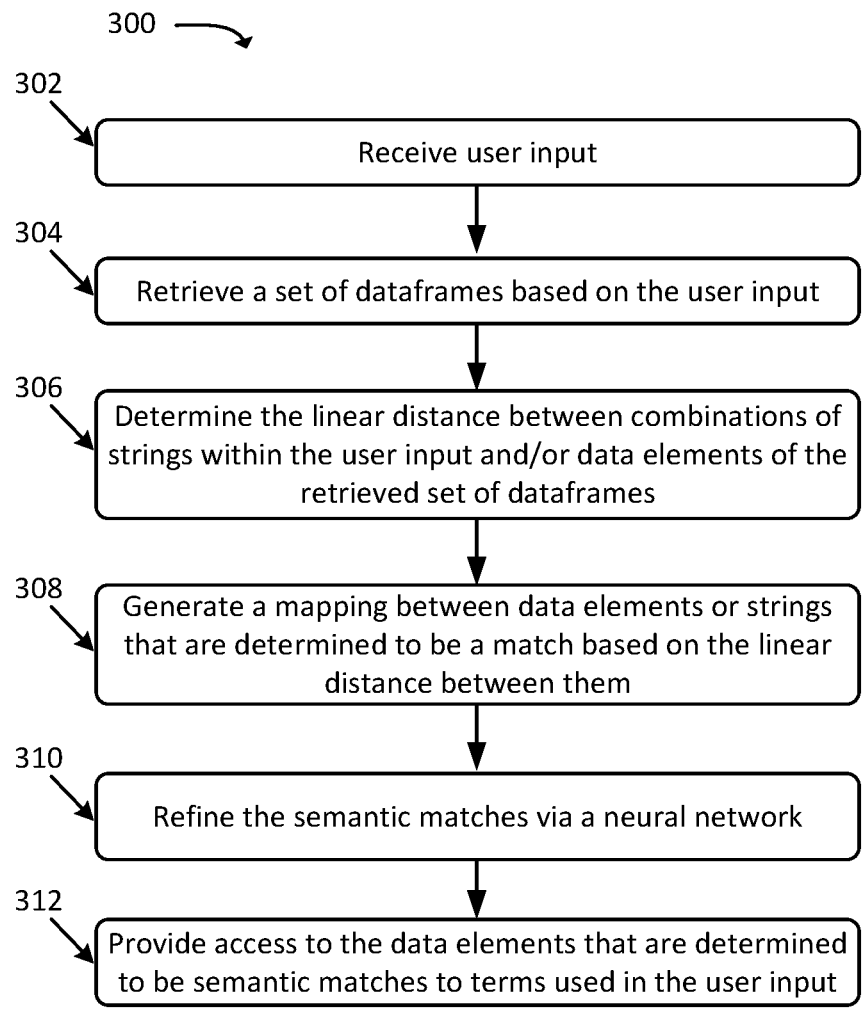
FIG. 3 presents a process for performing textual and/or semantic matching in accordance with some embodiments presented herein.

FIG. 3 presents a process 300 for performing the textual and/or semantic matching in accordance with some embodiments presented herein. Process 300 may be performed by cognitive database system 101.

Process 300 may include receiving (at 302) user input and/or machine-generated input. The input may include a query with an identifier for at least one data element in one data model. For example, the query may request and/or change the value for a particular data element in one data model, or may request a report for network performance at a particular RAN during a particular period of time. The report may be linked to a set of data elements in one or more data models.

Process 300 may include retrieving (at 304) a set of dataframes based on the input. Cognitive database system 101 may determine explicit references to one or more data models in the input, and may retrieve (at 304) the dataframes for the one or more data models. Additionally, cognitive database system 101 may perform the spatial and/or temporal mapping to determine requestor characteristics, and may retrieve (at 304) dataframes for data models that may be modified and/or accessed based on the determined requestor characteristics. As discussed above, each dataframe may include a set of vectors to represent the textual, visual, and/or other data from a data model.

Process 300 may include determining (at 306) the distance between combinations of strings within the input and/or data elements of the retrieved (at 304) set of dataframes. For instance, cognitive database system 101 may determine (at 306) a linear distance using trigram comparison, Levenshtein distance, Taro-Winkler distance, and/or other suitable algorithms for measuring the difference between two string sequences. The linear distance may provide a score that represents the commonality in two strings based on the number and/or placement of different characters in those strings and/or other similar strings that exist within the set of dataframes.

Process 300 may include generating (at 308) a mapping between data elements or strings that are determined to be a match based on the computed distance between them. The mapping may include scores that represent the accuracy of each match. For instance, cognitive database system may determine that the identifier "Product_X-et1" is a 75% match to the identifier "Product_X-v1" based on the distance between the two identifiers. Cognitive database system 101 may generate (at 308) a library or dictionary of identifiers that pertain to the same data element, wherein the data element may represent a product, service, offering, metric, characteristics, attribute, and/or other object or value that is tracked in the data models.

Process 300 may include refining (at 310) the semantic matches via a neural network, artificial intelligence, and/or machine learning. The neural network may incorporate data from external sources, such as the Internet, in order to identify semantic relationships that may exist within the external sources, and that may be applied to improve the accuracy of the string and/or word matching performed by cognitive database system 101. For instance, cognitive database system 101 may scan various external sources, and may determine that a semantic relationship between the identifier "Product_X-et1" and the identifier "Product_X-v1" exists in the external sources, and may therefore increase the accuracy of the match, that is determined from the distance between these terms in the dataframes, from 75% to 90%. In some embodiments, the neural network may query the external sources using the identifiers for a determined semantic match, and may adjust the accuracy of the match based on the query results returning the same or similar information or unrelated information. The artificial intelligence and/or machine learning may track historic changes made to the data models by different users or groups in order to improve the semantic matching by determining different data elements that may not be semantic matches or that may have a low match score, and that are manually modified to have the same value or modified contemporaneously to indicate a relationship between the data elements.

Process 300 may include providing (at 312) access to the data elements that are determined to be semantic matches to terms used in the input (e.g., semantic matches with accuracy scores that satisfy a threshold value). Providing (at 312) access may include retrieving data from the semantically matching data elements to include in a report or a response to the input, and/or may include modifying data in the semantically matching data elements based on changes that are made to a related data element that is explicitly specified in the input. In this manner, cognitive database system 101 may access and/or propagate changes to a plurality of data elements that are related to a particular data element referenced in the input without the input having to explicitly reference each data element of the plurality of data elements or access the data model where each such data element is stored.

The semantic matching may not identify all interrelated data in the data models. As noted above, some relationships between data elements, that have no semantic similarity, may be established visually (e.g., color-coding). For instance, data elements within different data models may be color-coded with the same color to present a relationship between the corresponding data of those data elements. In other cases, the color-coding may correspond to different intrinsic values or no values, and cognitive database system 101 may use the combination of visual matching and semantic matching to determine and/or verify a relationship between different data element that have the same or different visual representation in the data models. Accordingly, cognitive database system 101 may match the data elements across a second dimension to determine relationships based on visual properties of the data elements. Additionally, or alternatively, cognitive database system 101 may perform the visual matching to supplement and/or verify the accuracy of the semantic matching.

Figure 4:
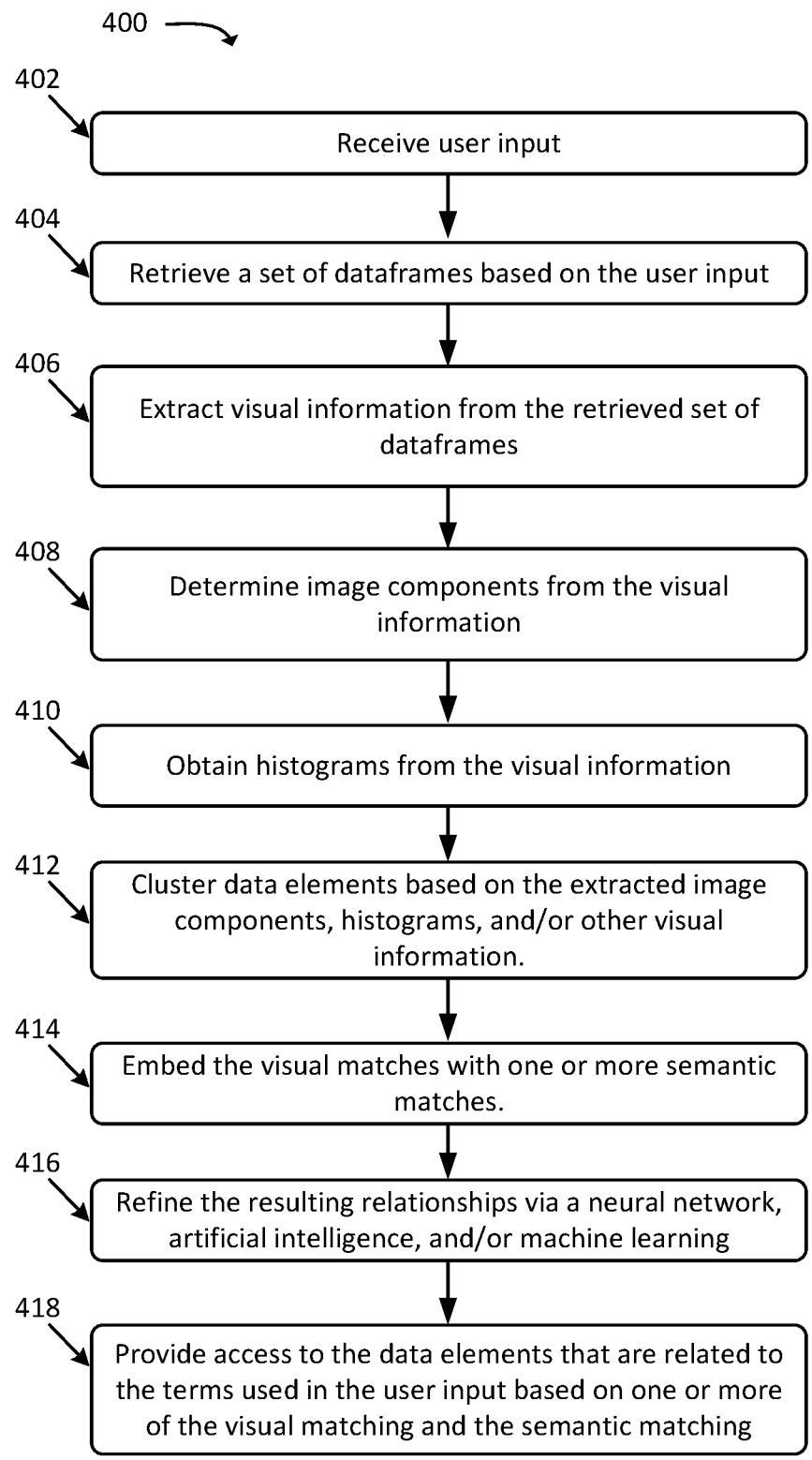
FIG. 4 presents a process for performing visual matching in accordance with some embodiments presented herein.

FIG. 4 presents a process 400 for performing the visual matching in accordance with some embodiments presented herein. Process 400 may be performed by cognitive database system 101.

Process 400 may include receiving (at 402) user input, and retrieving (at 404) a set of dataframes based on the user input. Process 400 may include extracting (at 406) visual information from the retrieved (at 404) set of dataframes. For instance, cognitive database system 101 may search through the dataframes to identify vectors with visual information, wherein the visual information may include color-coding of a data element or the cell storing the data in a data model. In some embodiments, extracting (at 406) the image data may include capturing the visual information from the dataframe vectors, and/or resizing the captured visual information to a common size. The vectorized representation of a data model may preserve the different sizes of cells in the data model. Accordingly, vectors with visual information may be defined with different sizes and/or other properties. Resizing the captured visual information may provide the visual information with common sizes and/or other properties for faster access, comparison, matching, and/or other operations.

Process 400 may include determining (at 408) image components from the visual information. For instance, cognitive database system 101 may determine (at 408) red, green, and blue ("RGB") color components for each cell or data element. The image components provide a first set of data with which cognitive database system 101 may determine visual matches between different data elements. Determining (at 408) the image components may include performing color recognition, image analysis, or decoding of the visual information to derive the image components.

Process 400 may include obtaining (at 410) histograms from the visual information. In some embodiments, the histograms may be represented as a feature vector. The histograms may provide cognitive database system 101 with information, in addition to the RGB color components, for visual matching purposes.

Process 400 may include clustering (at 412) data elements and/or the vectors representing the data elements based on the extracted image components, histograms, and/or other visual information. For instance, cognitive database system 101 may perform a K-means clustering to produce clusters of data elements that are matched based on color and/or visual characteristic commonality within the data models. In some embodiments, other clustering techniques may be used to match data elements based on commonality in their visual characteristics. The resulting clusters may group data elements that are related on the basis of the color or visual information provided for the data elements in the data models.

Process 400 may include embedding (at 414) the visual matches with one or more semantic matches. The embedding (at 414) may define a multi-dimensional relationship between two or more data elements. For instance, data (e.g., a word) that is stored in a first data element having a first color may have a different interpretation or definition than the same data being stored in a second data element having a second color. Accordingly, the multi-dimensional relationship may increase or verify the relationship between two or more data elements, or may provide an additional dimensional for determining the relationship between two or more data elements. As another example, cognitive database system 101 may determine a relationship between two data elements in the same or different data models based on a semantic match between the two data elements, and may define the relationship as one of a plurality of relationships based on the visual match results. Specifically, a first data element may be semantically matched to a second data element, and a first visual match between the first data element and the second data element may indicate adjusting the value of the data element by a first amount in response to a change to the first data element, whereas a second visual match between the first data element and the second data element may indicate keeping the value of the second data element constant with the first data element.

Process 400 may include refining (at 416) the resulting relationships via a neural network, artificial intelligence, and/or machine learning. Cognitive database system 101 may scan external sources and/or other data models to determine if a specific color provides a specific definition for a particular data element, and may track historic changes to the data models to define the relationship created by a visual match.

Process 400 may include providing (at 418) access to the data elements that are determined to be related to the terms used in the user input based on the visual matching, semantic matching, and/or embedding of the visual matching and semantic matching.

In some embodiments, the multi-dimensional matching may include matching the data elements on dimensions other than the above described semantic and visual dimensions. For instance, the multi-dimensional matching may include word-image matching.

Figure 5:
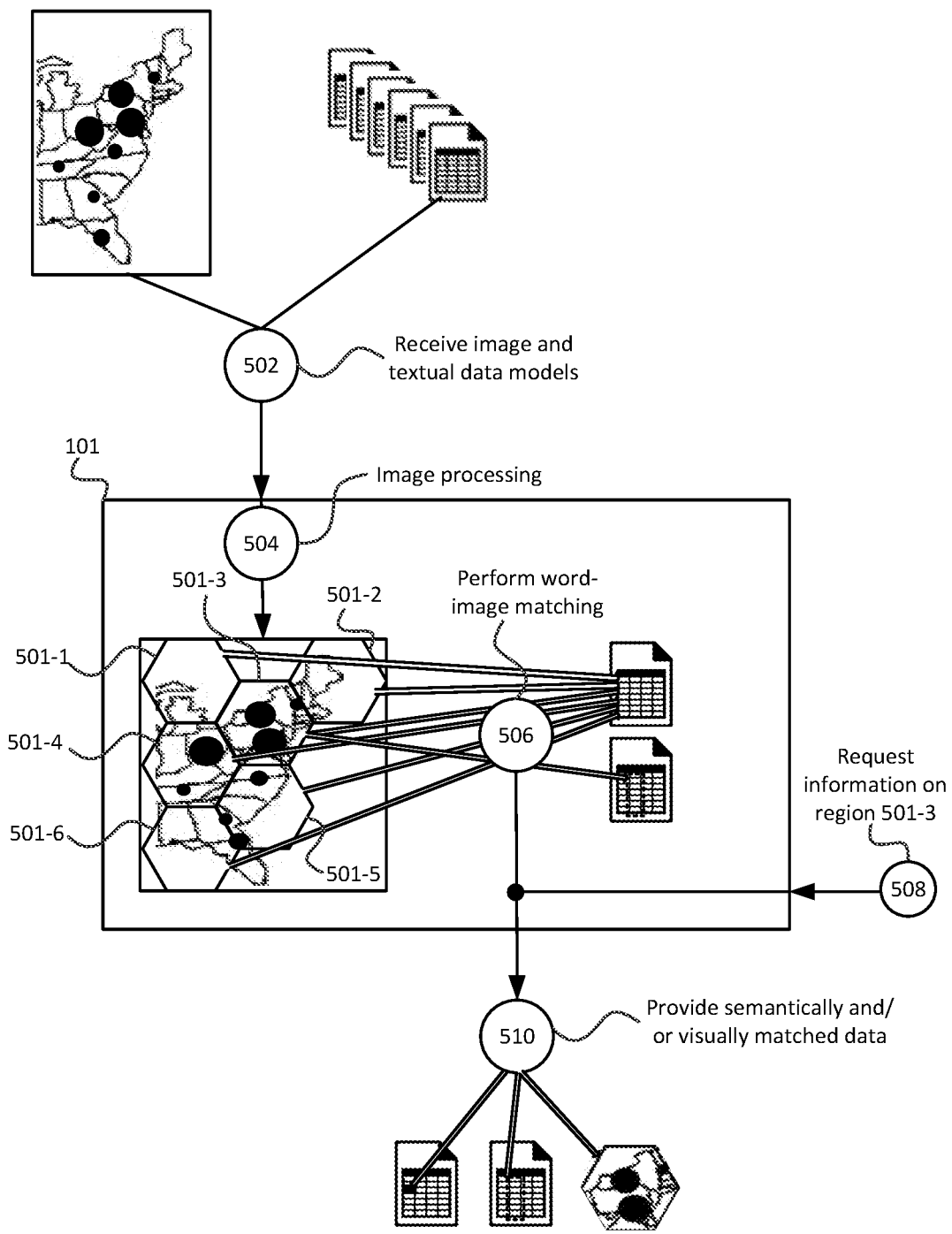
FIG. 5 illustrates an example of performing word-image matching in accordance with some embodiments presented herein.

FIG. 5 illustrates an example of performing the word-image matching in accordance with some embodiments presented herein. Cognitive database system 101 may perform the word-image matching in response to receiving (at 502) the data models with at least one data model corresponding to an image or other graphical representation. As shown in FIG. 5, the image may be a map that presents data graphically and at specific locations of the map. For instance, the image may be a map for historic, current, and/or expected network utilization at different geographic regions.

Cognitive database system 101 may process (at 504) the image using one or more image recognition routines to provide identifying metadata to the image or to specific sections of the image. As part of processing (at 504) the image, cognitive database system 101 may classify the image by determining that the received (502) image corresponds to a map, and may partition the image into a plurality of different regions 501-1, 501-2, 501-3, 501-4, 501-6, and 501-6 (collectively referred to as "regions 501", or individually referred to as "region 501").

Regions 501 may have uniform shapes, sizes, and/or forms to cover different areas within the image (e.g., hexagonal regions), or may have different shapes, sizes, and/or forms. Cognitive database system 101 may determine the area or location of each partitioned region 501, and may provide positional identifiers to identify each partitioned region 501. In some embodiments, the positional identifiers may include coordinates, zip codes, names (e.g., street, city, state, etc.), and/or other suitable identifying information.

Cognitive database system 101 may provide other identifying information in addition to or instead of the positional identifiers. For instance, the image recognition may extract data that is graphically represented in a region. The data may be defined according to a legend that is illustrated in the image or that is defined as part of the image metadata. For a map of network usage, the data may represent usage and/or performance statistics at different network sites (e.g., RANs). Alternatively, the data may be defined via queries to external sources. For instance, cognitive database system 101 may perform an image search using the image or a partitioned region of the image, and may parse the search results to classify and/or identify what is represented in the image or the partitioned region. The search results may identify a particular product, manufacturer, model, etc. Cognitive database system 101 may associate the extracted data with different regions 501. The data may be linked to regions 501, or may be specified as metadata of regions 501.

Cognitive database system 101 may perform the word-image matching by matching (at 506) the image-extracted data to the data within the dataframes or dataframe vectors that represent the data models. In response to detecting a match between the image data and the data model data, cognitive database system 101 may create a relationship between the data by linking the data. In some embodiments, cognitive database system 101 may perform a spatial join to link a partitioned region of an image to one or more data elements that include spatial data corresponding to the location or area represented by the partitioned region. For instance, cognitive database system 101 may determine a match between part of an image, that shows network usage at a particular region, and a particular data element with a key corresponding to a cell site identifier for a particular RAN that has a coverage area spanning that particular region, and may further match a numerical value from the particular data value, that represents network usage at the particular RAN, to the graphical depiction of the network usage at the particular region.

In some embodiments, cognitive database system 101 may join the data based on matching keywords or terms. For instance, an image that is identified as a particular product may be linked to data elements from one or more data models that include one or more identifiers for the particular product. The particular product identifiers may include the make and model, serial numbers, keywords, and/or other values for representing the particular product in the data models.

Cognitive database system 101 may provide access to one or more of the partitioned image regions in response to user input that accesses other data that is linked to the one or more partitioned image regions as a result of the word-image matching. For instance, cognitive database system 101 may receive (at 508) user input that requests a report and that includes an identifier for a particular region. In response to the user input, cognitive database system 101 may provide (at 510) first data from a first data model that is a direct match for the identifier, and may provide second data, that includes additional data that is semantically or visually matched to the first data from another data model and the partitioned image region for the particular region, as part of a report or a comprehensive response to the user input.

In some embodiments, cognitive database system 101 may construct a vector feature model based on the data relationships that are automatically discovered as a result of the multi-dimensional matching described above. The vector feature model may capture the semantic context of database entries for different data models.

Cognitive database system 101 may integrate the vector feature model into a SQL infrastructure to enhance user queries. In some embodiments, cognitive database system 101 may enhance user queries to access data from any of the different and separate data models that are ingested into cognitive database system 101, and to apply a user query, that targets a particular data element, to a subset of data elements that may be stored in the same data model or different data models than the particular data element, and that are impacted by a change to the particular data element as a result of a relationship with the particular data element as determined from the multi-dimensional matching.

In some embodiments, cognitive database system 101 may receive user input for updating a particular data element. Cognitive database system 101 may modify the user query and/or may automatically generate additional queries to update the subset of data elements that are impacted by the change to the particular data element based on the determined relationships between the particular data element and each data element of the subset of data elements. In this manner, cognitive database system 101 may expose the vector feature model via a new class of SQL-based analytics queries known as cognitive intelligence ("CI") queries. The CI queries may enable complex queries over multi-modal data such as semantic matching and/or inductive reasoning queries such as analogies.

Figure 6:
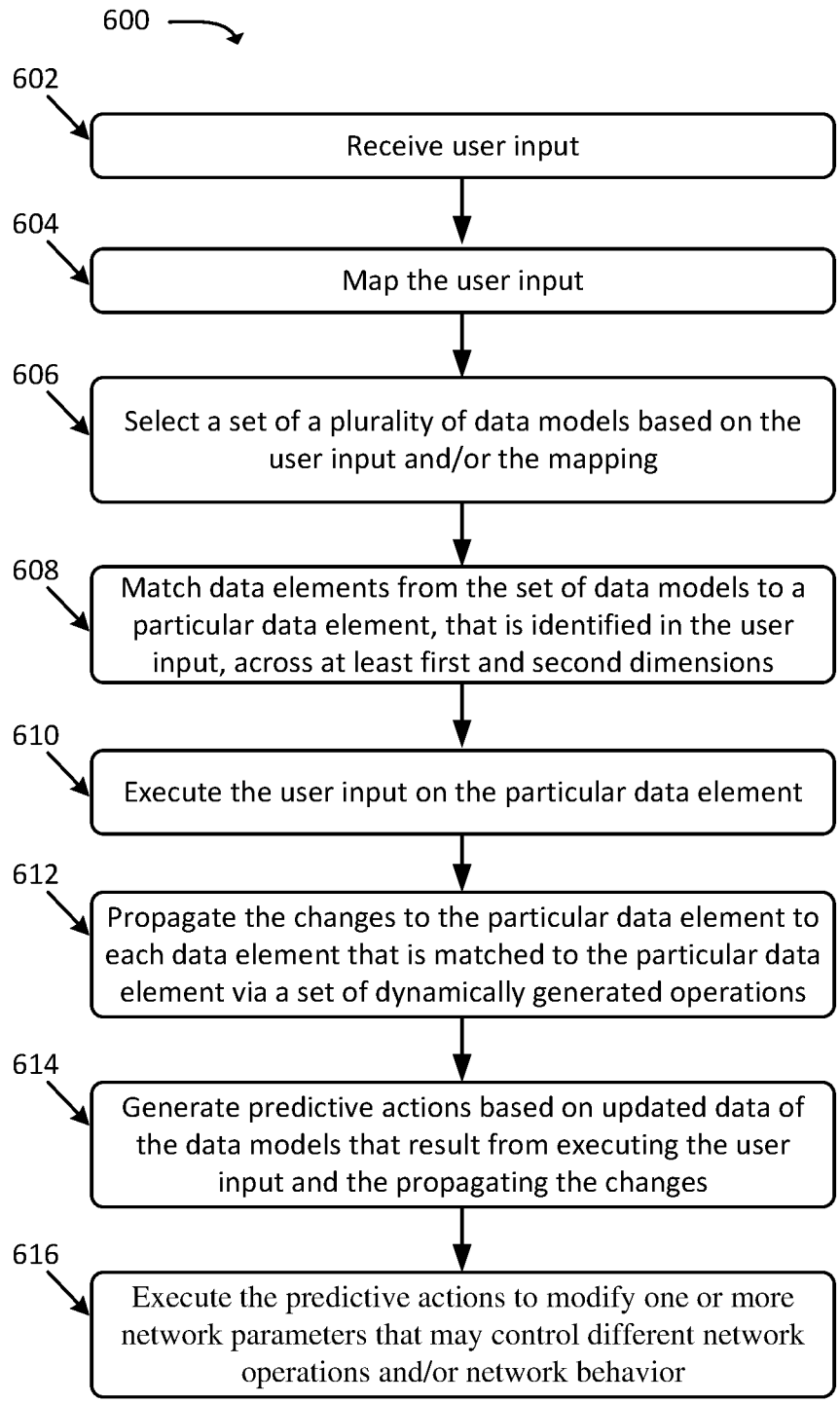
FIG. 6 presents a process for performing dynamic query manipulation in accordance with some embodiments presented herein.

FIG. 6 presents a process 600 for performing dynamic query manipulation in accordance with some embodiments presented herein. Cognitive database system 101 may perform process 600 in order to propagate user input across different data that is determined to be related as a result of the multi-dimensional matching, and/or to produce comprehensive reports or responses to user input that include interrelated data that is not directly specified as part of the user input.

Process 600 may include receiving (at 602) the user input. Cognitive database system 101 may receive the user input from one or more UIs, Representational State Transfer ("REST") API, and/or other interfaces, applications, or tools. The user input may be defined as a query to access and/or update at least one particular data element that is stored in a first data model.

In some embodiments, cognitive database system 101 may receive (at 602) the user input by intercepting and/or tracking user interactions with the first data model. For instance, cognitive database system 101 may detect a change being made to the particular data element, and may generate an internal query based on the detected change.

In some embodiments, the user input may correspond to input that is machine-generated by one or more sensors and/or devices that provide updated data to cognitive database system 101. In some such embodiments, the machine-generated input may be used to update specific data elements in real-time. For instance, different base stations of a wireless network may provide cognitive database system 101 with updated network utilization statistics, capacity updates, connectivity updates, etc. that are stored to different data elements of different data models.

Process 600 may include mapping (at 604) the user input. As noted above, cognitive database system 101 may perform a spatial and/or temporal mapping (at 604) to obtain additional information about the requestor based on the time and location of the user input.

Process 600 may include selecting (at 606) a set of a plurality of data models based on the user input and/or the mapping (at 604). In particular, cognitive database system 101 may select the set of data models that are implicated by and/or related to the particular data element, the first data model, and/or other parameters of the user input, the spatial mapping of the user input, and/or the temporal mapping of the user input.

Process 600 may include matching (at 608) data elements from the set of data models to the particular data element of the first data model, that is identified in the user input, across at least first and second dimensions. The matching (at 608) may include performing two or more of the semantic matching, the visual matching, the word-image matching, and/or matching across other dimensions. Each match may indicate a potential relationship between the particular data element and other data elements in the first data model and/or other data models in the set of data models. The amount by which two data elements match may be scored across each dimension, and a relationship between two data elements may be verified or created in response to the cumulative score for the match the two data elements across the two or more dimensions satisfying a threshold value. In some embodiments, the matches may establish different relationships between different pairs and/or sets of data elements. For instance, the particular data element may store the frequency bands that are used by the UEs to communicate with a particular base station in a network resource first data model. Cognitive database system 101 may perform the multi-dimensional matching to determine that the particular data element is related to, impacts, and/or otherwise affects a first data element, that indicates available and/or used RF resources for a particular RAN associated with the particular base station, in the same network resource first data model, a second data element, that derives network performance at the particular RAN based on an allocation of the frequency bands, in a network performance second data model, and/or a third data element, that identifies active RATs, frequency bands, and/or beamforming information associated with the particular base station, in a network configuration third data model.

Process 600 may include executing (at 610) the user input on the particular data element of the first data model. Executing (at 610) the user input may include accessing and/or updating the particular data element in the manner specified by the user input. For instance, the user input may provide a new value that updates the frequency bands that are used by the UEs to communicate with the particular base station. Accordingly, executing (at 610) the user input may include replacing the existing value with the user input value, and storing the user input value in the first data model.

Process 600 may include propagating (at 612) the changes to the particular data element to each data element that is matched (at 608) to the particular data element via a set of dynamically generated queries, input, commands, and/or operations. The dynamically generated operations may perform different updates to the matching and/or interrelated data elements based on different relationships that may exist between the particular data element and each of the matching and/or interrelated data elements. For instance, as a result of updating the used frequency bands, cognitive database system 101 may update the available and/or used RF resources for the particular RAN, network performance of the particular RAN, and/or network configuration parameters for particular RAN or the respective base station. In some embodiments, propagating (at 612) the changes to the matching and/or interrelated data elements may include updating values of the matching and/or interrelated data element based on monitored values of key performance indicators ("KPIs"), performance metrics, load metrics, etc. of RANs, base stations, etc. that are matched to the particular data element and/or the user input.

In some embodiments, the user input may include request for a report that is keyed on the particular data element, and executing (at 610) the user input may include populating the report with the particular data element and interrelated data from other data models based on the multi-dimensional matching (at 608), wherein the interrelated data may be updated prior to be being included the report as a result of propagating (at 612) the changes across the interrelated data. For instance, the report request may identify a report that has been previously defined, or may provide parameters for the data that is to be included in the requested report. Cognitive database system 101 may retrieve data from the dataframes corresponding to the one or more data models where the report data is stored. In some embodiments, cognitive database system 101 may retrieve a first set of data that is directly relevant to the report, and may retrieve a second set of data that is related and/or matched to the first set of data. Cognitive database system may then dynamically generate the report with the first set of data and the second set of data to provide to the requestor.

Process 600 may include generating (at 614) predictive actions based on updated data of the set of data models that result from executing (at 610) the user input and/or propagating (at 612) the changes across the related data. In particular, cognitive database system 101 may generate (at 614) the predictive actions from the cumulative change to the data models and/or based on a holistic analysis of the updated data models. The predictive actions may be generated without user input or user interaction.

In some embodiments, cognitive database system 101 may be configured with one or more predictive and/or forecasting models from which the predictive actions are generated. Cognitive database system 101 may provide updated data from the set of data models to a predictive and/or forecasting model when one or more data elements of set of data models change in response to the user input. The predictive and/or forecasting model may output one or more predictive actions based on the updated data. For instance, the user input may include updating demand at one or more network sites. Cognitive database system 101 may propagate the changes across the data models. Propagating the changes may include updating another data model that tracks configured resources at the one or more network sites based on the updated demand. The predictive model may then ingest the updated demand, the configured resources, and/or data from other data models that identify the coverage areas of each network site, the performance of each network site, and/or other usage metrics, and may output a predictive action for shifting resources to network sites where the updated demand is disproportionate to the configured resources.

Process 600 may include executing (at 616) the predictive actions to modify one or more network parameters that may control different network operations and/or network behavior, and/or to modify a resource allocation for one or more RANs, base stations, and/or other network devices. For instance, executing (at 616) the predictive actions may include changing operational and/or configuration parameters of one or more RANs, base stations, edge computing locations, and/or core network components. The resulting changes may increase, decrease, and/or shift capacity from one RAN to another, modify RATs that are used to communicate with UEs, change beam configuration, provide different QoS for different content, services, and/or UEs, and/or dynamically deploy resources to different locations based on changing demand at those locations. In some embodiments, executing (at 616) the predictive actions may include modifying a resource allocation of a network component, that provides UEs access to network services, based on a demand shift that is detected from querying or updating the particular data element identified in the user input, and from a set of data elements that are determined to be dependent on or interrelated to the particular data elements as a result of the multi-dimensional matching and/or that receive updated values as a result of propagating changes from the particular data element to the dependent or interrelated set of data elements.

In some embodiments, the multi-dimensional matching, report generation, and/or predictive action generation may be computationally intensive. The computational overhead may increase as the number of data models increases, and/or the number of simultaneous requests that involve unique execution of the multi-dimensional matching, report generation, and/or predictive action generation increases. Accordingly, cognitive database system 101 may be optimized for real-time analytics.

Optimizing cognitive database system 101 for real-time analytics may include performing one or more of the multi-dimension matching, report generation, and/or predictive action generation on one or more quantum computers. Quantum computers may use quantum bit or "qubits" to process large amounts of data at a given time and/or determine multiple computational states in a single cycle, thereby performing the multi-dimensional matching, report generation, and/or predictive action generation in less time and in fewer operations than with traditional binary computers.

Figure 7:
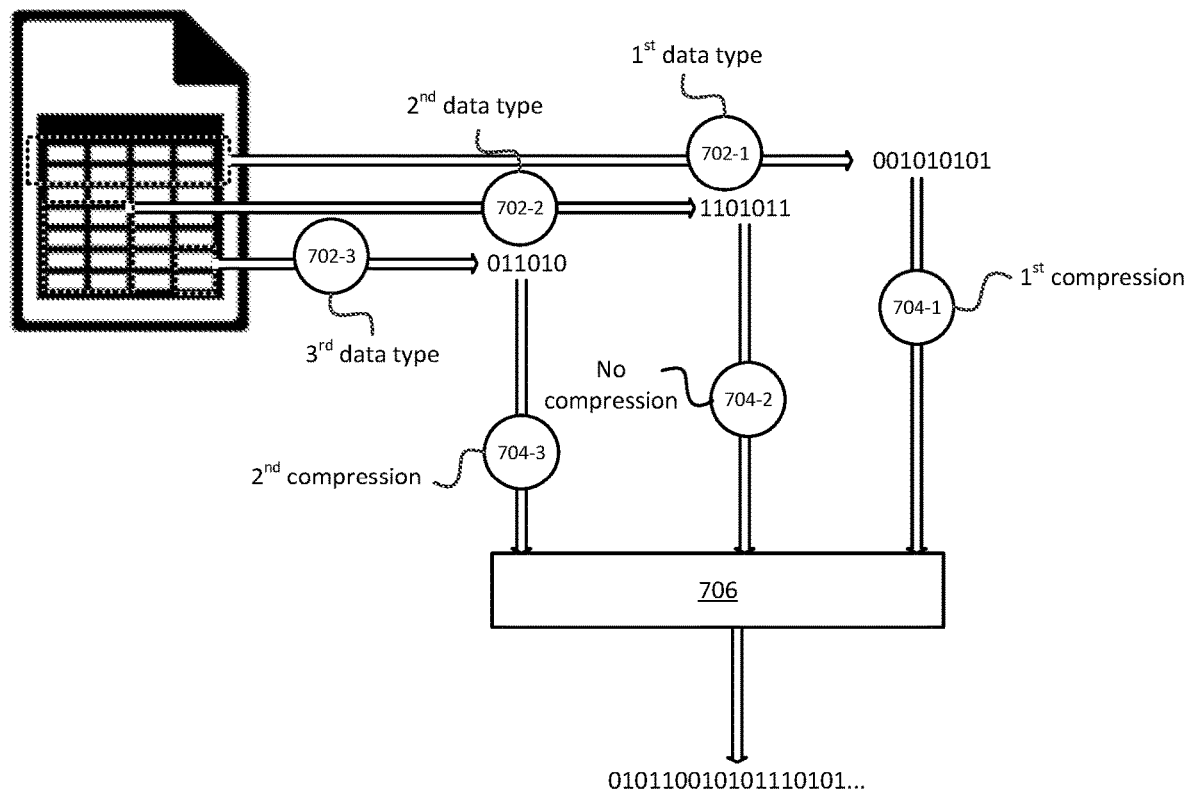
FIG. 7 illustrates an example of a quantum channel for securely and efficiently transferring binary data to a quantum computing system in accordance with some embodiments presented herein.

Accordingly, some embodiments provide a quantum channel for converting the binary data that encodes the data of the data models to the qubit format of a quantum computing system, and for the secure and efficient transfer of the data to the quantum computing system. FIG. 7 illustrates an example of the quantum channel in accordance with some embodiments presented herein.

The quantum channel may be established between cognitive database system 101 and a quantum computing system. The quantum channel may involve performing a variable compression of the binary data, that represent the dataframe vectors and/or the data model data, into different compressed datasets that the quantum computing system may directly convert and/or decompress into quantum bits.

As shown in FIG. 7, the variable compression may include performing (at 702) statistical data typecasting, prior to compression, to differentiate the data based on specific data types. For instance, cognitive database system 101 may differentiate (at 702-1) data of a first data type, may differentiate (at 702-2) data of a second data type, and/or may differentiate data of a third data from a particular data model and/or dataset. The different data types may include string data, time data, type-casted data, and/or other binary-formatted data. In particular, the data may be differentiated for specific sequences of quantum gates or quantum operations based on the specific data types.

The variable compression may include selectively compressing (at 704) the differentiated data with different compression or with no compression. As shown in FIG. 7, cognitive database system 101 may compress (at 704-1) data of the first data type using a first compression algorithm, may leave (at 704-2) data of the second data type uncompressed, and/or may compress (at 704-3) data of the third data type with a second compression algorithm. In some embodiments, independent and equi-probable data of a first data type may not need compression or may be compressed using a first compression that provides the greatest reduction in size for the data of the first data type relative to other compressions, and data of a second data type with asymmetric and predicted patterns may be compressed using a different second compression that provides the greatest reduction in size for the data of the second data type relative to other compressions.

The quantum channel may securely and efficiently transfer the dataframe vectors and/or the data model data to the quantum computing system by providing the selectively compressed datasets in place of the binary data that represent the dataframe vectors and/or the data model data to the quantum computing system. The quantum channel may include decompressing (at 706) and converting the transferred datasets into qubits for direct processing by specific quantum registers of the quantum computing system based on the data type of each dataset. In some embodiments, the quantum computing system may determine the data type for each transferred dataset based on the applied compression, metadata tags, and/or other identifiers included with the dataset, may determine an optimal qubit depth based on the determined data type, may decompress and convert the dataset to qubits of the determined depth, and may provide the qubits to a different set of quantum circuits that are optimized for processing qubits of the determined depth and/or datasets of the determined data type. As an example, for a block of N number of classical bits, the quantum computing system may use a quantum circuit that operates on a tensor product of N. The output of the quantum computing system may be converted back to binary bits and returned (at 708) to cognitive database system 101 for presentation and/or further processing.

Figure 8:
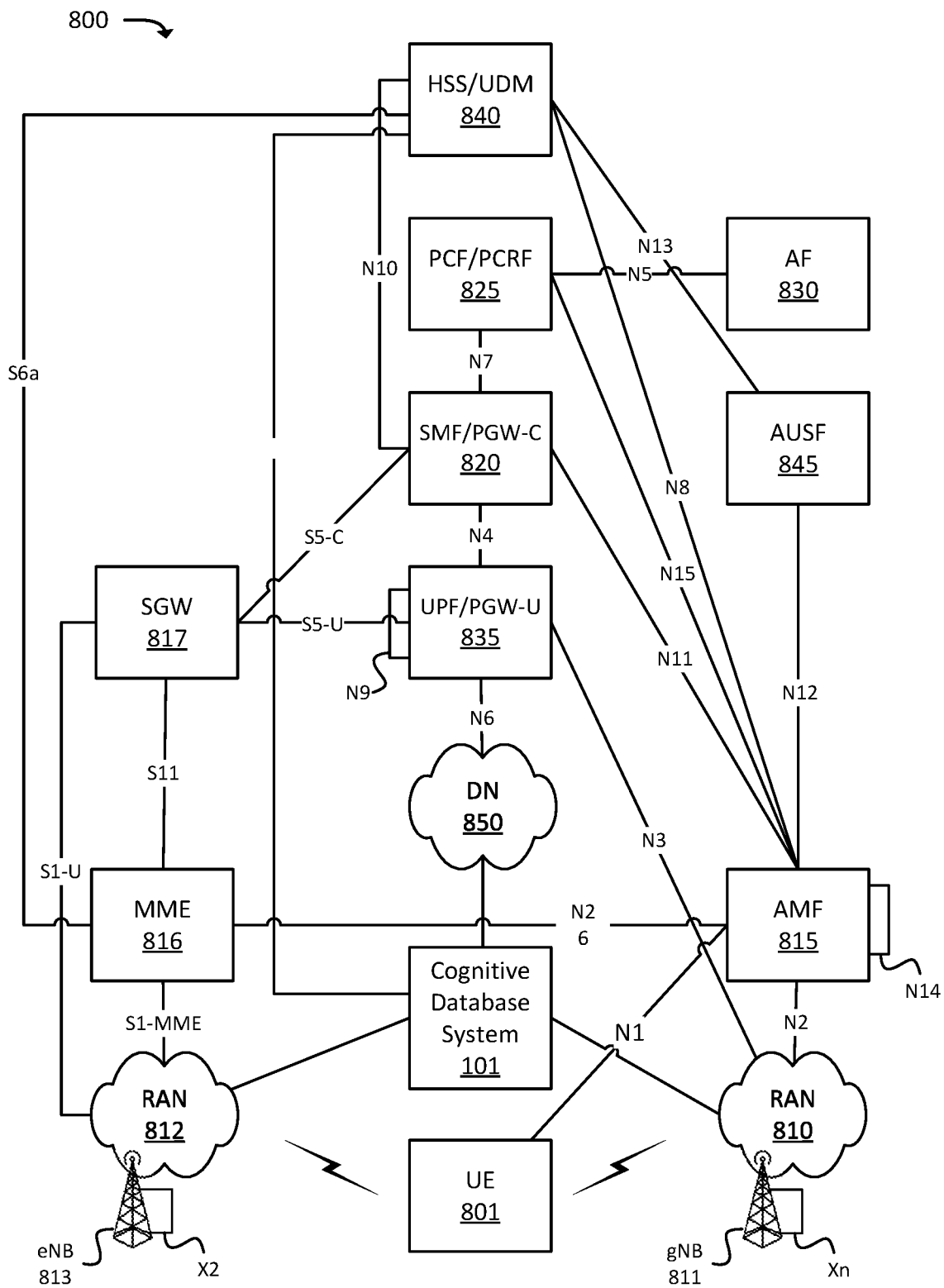
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G RAT may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more gNBs 811), RAN 812 (which may include one or more one or more eNBs 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, Authentication Server Function ("AUSF") 845, and cognitive database system 101. Environment 800 may also include one or more networks, such as Data Network ("DN") 850.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

In some embodiments, cognitive database system 101 may process data models that include configuration, resource, usage, and/or other information about one or more of the network components. As some of the components are interrelated and/or may access the same or interrelated data in the same or different data models, cognitive database system 101 may ensure that updates to one data element are propagated to other interrelated data elements in the same or different data models, and may generate and/or execute predictive actions that control or modify operational parameters and/or behavior of one or more network components based on the collective data from the set of data models. As was noted above, cognitive database system 101 may modify a beam configuration and/or other parameters for one or more of gNB 811 and eNB 813 based on interrelated data within the data models that is matched via the multi-dimensional matching performed by cognitive database system 101. In some embodiments, cognitive database system 101 may be a device or component within an organization or enterprise, and may perform the multi-dimensional matching, query manipulation, predictive action generation, and/or predictive action execution based on the data models of the organization or enterprise.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
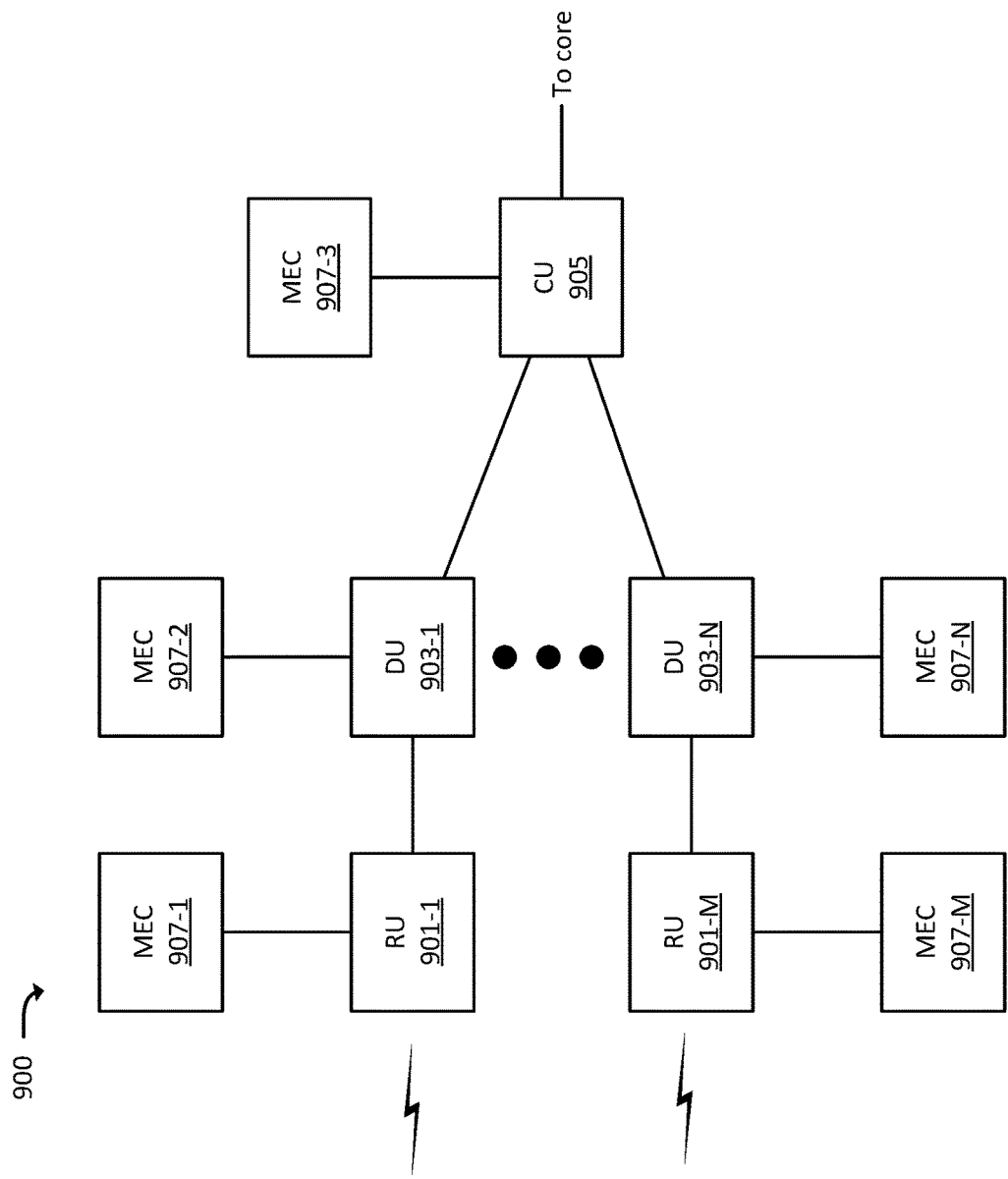
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("Rus") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network.

MEC 907 may include, and/or may implement some or all of the functionality described above with respect to cognitive database system 101. In some embodiments, cognitive database system 101 may perform the multi-dimensional matching, query manipulation, predictive action generation, and/or predictive action execution based on data models that contain configuration, usage, performance, resource, and/or other information for MECs 907, RUs 901, DUs 903, and/or CU 905, and may execute predictive actions that involve changing or modifying operation and/or behavior of these components.

Figure 10:
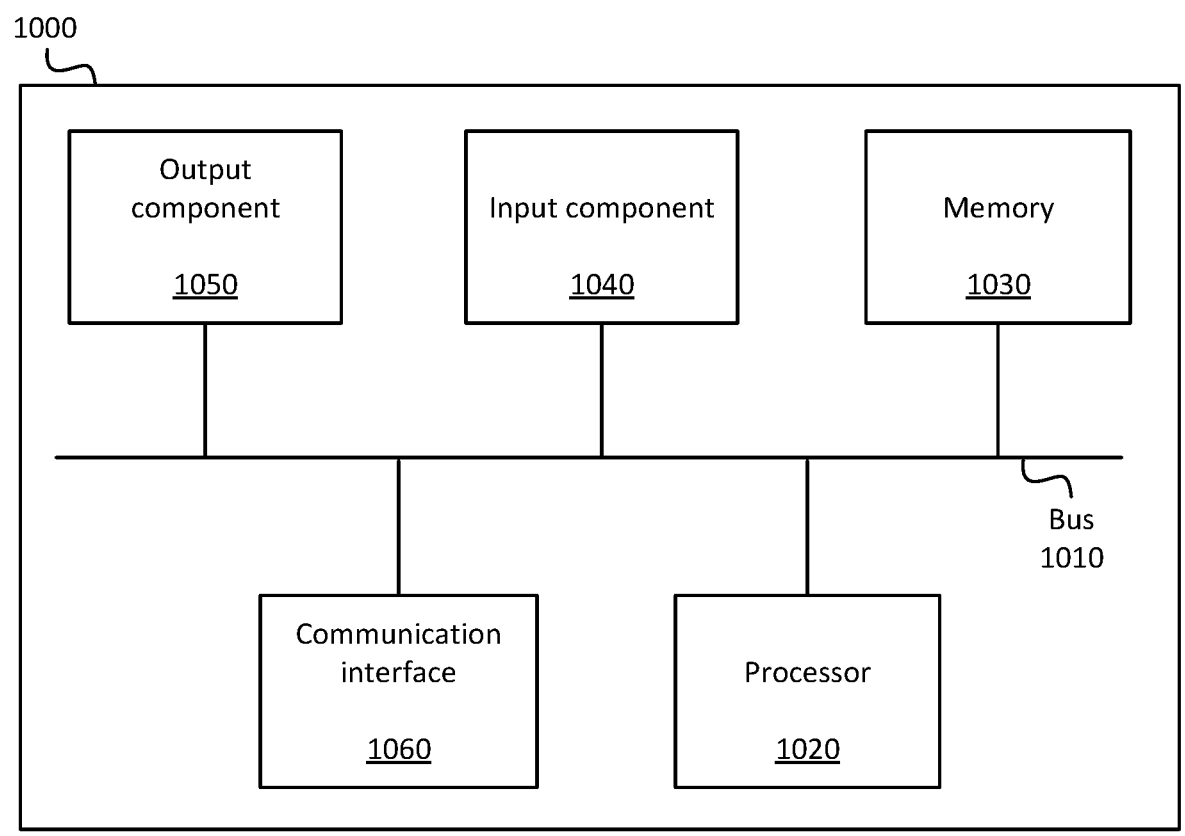
FIG. 10 illustrates example components of one or more devices, in accordance with one or more embodiments described herein.

FIG. 10 illustrates example components of device 1000. One or more of the devices described above (e.g., cognitive database system 101, quantum computing system, etc.) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1 and 3-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive user input that is directed to a particular data element in at least a first data model of a plurality of data models, wherein each data model of the plurality of data models comprises a plurality of data elements;
match the particular data element to a first set of data elements in the plurality of data models based on semantic commonality between the particular data element and the first set of data elements;
match the particular data element to a second set of data elements in the plurality of data models based on visual commonality between graphical representations of the particular data element and the second set of data elements in the plurality of data models;
determine interdependency between the particular data element and a particular subset of data elements from the first set of data elements and the second set of data elements based on a measure of similarity between the particular subset of data elements and the particular data element;
generate a response to the user input comprising values from the particular subset of data elements that are updated directly from the determined interdependency;
generate an executable action based on an updated value that is specified for the particular data element in the user input, and updated values for the particular subset of data elements that are derived from the interdependency between the particular data element and the particular subset of data elements; and
execute the executable action, wherein executing the executable action comprises modifying a resource allocation of a network component, that provides one or more user equipment ("UEs") access to network services, based on a demand shift detected from the updated value that is specified for the particular data element in the user input, and updated values for the particular subset of data elements that are derived from the interdependency between the particular data element and the particular subset of data elements.

2. The device of claim 1, wherein the one or more processors are further configured to:
update the particular data element with a new value provided as part of the user input; and
propagate different changes across the particular subset of data elements based on different interdependencies between the particular data element and the particular subset of data elements, and further based on the new value of the particular data element.

3. The device of claim 2, wherein propagating the different changes comprises:
modifying a value of a first data element from the particular subset of data elements based on a first interdependency between the value of the first data element and the new value of the particular data element; and
modifying a value of a second data element from the particular subset of data elements based on a different second interdependency between the value of the second data element and the new value of the particular data element.

4. The device of claim 1, wherein matching the particular data element to the second set of data elements comprises:
matching coloring from a graphical representation of the particular data element to coloring from a graphical representation of a data element from the second set of data elements.

5. The device of claim 1, wherein the one or more processors are further configured to:
perform one or more of a spatial mapping or a temporal mapping based on an originating location of the user input; and
select a set of the plurality of data models comprising the first set of data elements and the second set of data elements based on results from one or more of the spatial mapping or the temporal mapping.

6. The device of claim 1, wherein matching the particular data element to the first set of data elements comprises:
determining a distance between an identifier of the particular data element and identifiers of the first set of data elements; and
identifying a match in response to a distance between the identifier of the particular data element and an identifier of a data element from the first set of data elements being less than a threshold amount.

7. The device of claim 1, wherein matching the particular data element to the second set of data elements comprises:

determining visual characteristics for a graphical representation of the particular data element in the first data model;
determining visual characteristics for a graphical representation of each of the second set of data elements in the plurality of data models; and
identifying a match in response to a measure of similarity of the visual characteristics for the graphical representation of the particular data element and the visual characteristics for the graphical representation of a data element from the second set of data elements satisfying a threshold measure of similarity.

8. A method comprising:
receiving user input that is directed to a particular data element in at least a first data model of a plurality of data models, wherein each data model of the plurality of data models comprises a plurality of data elements;
matching the particular data element to a first set of data elements in the plurality of data models based on semantic commonality between the particular data element and the first set of data elements;
matching the particular data element to a second set of data elements in the plurality of data models based on visual commonality between graphical representations of the particular data element and the second set of data elements in the plurality of data models;
determining interdependency between the particular data element and a particular subset of data elements from the first set of data elements and the second set of data elements based on a measure of similarity between the particular subset of data elements and the particular data element; and
generating a response to the user input comprising values from the particular subset of data elements that are updated directly from the determined interdependency;
generating an executable action based on an updated value that is specified for the particular data element in the user input, and updated values for the particular subset of data elements that are derived from the interdependency between the particular data element and the particular subset of data elements; and
executing the executable action, wherein executing the executable action comprises modifying a resource allocation of a network component, that provides one or more user equipment ("UEs") access to network services, based on a demand shift detected from the updated value that is specified for the particular data element in the user input, and updated values for the particular subset of data elements that are derived from the interdependency between the particular data element and the particular subset of data elements.

9. The method of claim 8 further comprising:
updating the particular data element with a new value provided as part of the user input; and
propagating different changes across the particular subset of data elements based on different interdependencies between the particular data element and the particular subset of data elements, and further based on the new value of the particular data element.

10. The method of claim 9, wherein propagating the changes comprises:
modifying a value of a first data element from the particular subset of data elements based on a first interdependency between the value of the first data element and the new value of the particular data element; and
modifying a value of a second data element from the particular subset of data elements based on a different second interdependency between the value of the second data element and the new value of the particular data element.

11. A non-transitory computer-readable medium, storing a plurality of processor-executable instructions to:
receive user input that is directed to a particular data element in at least a first data model of a plurality of data models, wherein each data model of the plurality of data models comprises a plurality of data elements;
match the particular data element to a first set of data elements in the plurality of data models based on semantic commonality between the particular data element and the first set of data elements;
match the particular data element to a second set of data elements in the plurality of data models based on visual commonality between graphical representations of the particular data element and the second set of data elements in the plurality of data models;
determine interdependency between the particular data element and a particular subset of data elements from the first set of data elements and the second set of data elements based on a measure of similarity between the particular subset of data elements and the particular data element;
generate a response to the user input comprising values from the particular subset of data elements that are updated directly from the determined interdependency
generate an executable action based on an updated value that is specified for the particular data element in the user input, and updated values for the particular subset of data elements that are derived from the interdependency between the particular data element and the particular subset of data elements; and
execute the executable action, wherein executing the executable action comprises modifying a resource allocation of a network component, that provides one or more user equipment ("UEs") access to network services, based on a demand shift detected from the updated value that is specified for the particular data element in the user input, and updated values for the particular subset of data elements that are derived from the interdependency between the particular data element and the particular subset of data elements.

12. The non-transitory computer-readable medium of claim 11, wherein matching the particular data element to the second set of data elements comprises:
matching coloring from a graphical representation of the particular data element to coloring from a graphical representation of a data element from the second set of data elements.

13. The non-transitory computer-readable medium of claim 11, wherein the plurality of processor-executable instructions further include instructions to:
perform one or more of a spatial mapping or a temporal mapping based on an originating location or time of the user input; and
select a set of the plurality of data models comprising the first set of data elements and the second set of data elements based on results from one or more of the spatial mapping or the temporal mapping.

14. The non-transitory computer-readable medium of claim 11, wherein matching the particular data element to the first set of data elements comprises:
determining a distance between an identifier of the particular data element and identifiers of the first set of data elements; and identifying a match in response to a distance between the identifier of the particular data element and an identifier of a data element from the first set of data elements being less than a threshold amount.

15. The non-transitory computer-readable medium of claim 11, wherein the plurality of processor-executable instructions further include instructions to:
update the particular data element with a new value provided as part of the user input; and
propagate different changes across the particular subset of data elements based on different interdependencies between the particular data element and the particular subset of data elements, and further based on the new value of the particular data element.

16. The non-transitory computer-readable medium of claim 15, wherein propagating the different changes comprises:
modifying a value of a first data element from the particular subset of data elements based on a first interdependency between the value of the first data element and the new value of the particular data element; and
modifying a value of a second data element from the particular subset of data elements based on a different second interdependency between the value of the second data element and the new value of the particular data element.

17. The non-transitory computer-readable medium of claim 11, wherein the plurality of processor-executable instructions further include instructions to:
perform a spatial mapping based on an originating location associated with the user input; and
select a set of the plurality of data models comprising the first set of data elements and the second set of data elements based on results from the spatial mapping.

18. The non-transitory computer-readable medium of claim 11, wherein the plurality of processor-executable instructions further include instructions to:
perform a temporal mapping based on an originating time associated with the user input; and
select a set of the plurality of data models comprising the first set of data elements and the second set of data elements based on results from the temporal mapping.

19. The method of claim 8, further comprising:
performing a temporal mapping based on an originating time associated with the user input; and
selecting a set of the plurality of data models comprising the first set of data elements and the second set of data elements based on results from the temporal mapping.

20. The method of claim 8, further comprising:
performing a spatial mapping based on an originating location associated with the user input; and
selecting a set of the plurality of data models comprising the first set of data elements and the second set of data elements based on results from the spatial mapping.

* * * * *